(12) United States Patent
Liang (10) Patent No.: US 12,393,104 B2
(45) Date of Patent: Aug. 19, 2025

(54) ELECTRONIC DEVICE AND CAMERA MODULE THEREOF HAVING A DRIVER THAT DRIVES A SLIDER TO MOVE, A LENS COMPONENT ROTATING WITH MOVEMENT OF THE SLIDER

(71) Applicant: VIVO MOBILE COMMUNICATION CO., LTD., Dongguan (CN)

(72) Inventor: Lei Liang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 295 days.

(21) Appl. No.: 18/214,516

(22) Filed: Jun. 26, 2023

(65) Prior Publication Data

US 2023/0341751 A1 Oct. 26, 2023

Related U.S. Application Data

(63) Continuation of application No. PCT/CN2021/141067, filed on Dec. 24, 2021.

(30) Foreign Application Priority Data

Dec. 28, 2020 (CN) .......................... 202011585976.1

(51) Int. Cl.
*H04N 5/335* (2011.01)
*G03B 17/12* (2021.01)
*H04N 23/55* (2023.01)

(52) U.S. Cl.
CPC ............ *G03B 17/12* (2013.01); *H04N 23/55* (2023.01)

(58) Field of Classification Search
CPC ....................................................... G03B 17/12
See application file for complete search history.

(56) References Cited

U.S. PATENT DOCUMENTS 4,359,256 A * 11/1982 Gallusser ............. H01R 13/623
439/314
10,025,164 B2 * 7/2018 Weidner ................. G03B 17/12
(Continued)

FOREIGN PATENT DOCUMENTS

CN 206193372 U 5/2017
CN 110673656 A 1/2020
(Continued)

OTHER PUBLICATIONS

International Search Report issued in corresponding International Application No. PCT/CN2021/141067, mailed Jan. 27, 2022, 7 pages.
(Continued)

*Primary Examiner* — Gary C Vieaux
(74) *Attorney, Agent, or Firm* — IPX PLLC (57) ABSTRACT

An electronic device and a camera module thereof are provided. The camera module includes a lens component, a module bracket, a driving component on the module bracket, and at least three connection components. The at least three connection components are arranged around the periphery of the lens component. Each connection component includes a first fitting portion provided on the module bracket, a second fitting portion provided on the lens component, and a first sliding portion and a second sliding portion connected to each other. The first sliding portion is slidably fitted with the first fitting portion, and the second sliding portion is slidably fitted with the second fitting portion. Extension directions of the first fitting portion and the second fitting portion are both different from the direction of the optical axis of the lens component.

18 Claims, 4 Drawing Sheets

(56) References Cited

U.S. PATENT DOCUMENTS

| | | | |
|---|---|---|---|
| 11,050,939 B2 | 6/2021 | Sasaki et al. | |
| 12,292,619 B2* | 5/2025 | Liu | G06F 1/163 |
| 2015/0331221 A1* | 11/2015 | Koiwai | G02B 7/10 |
| | | | 359/701 |
| 2017/0139225 A1 | 5/2017 | Lim | |
| 2024/0111126 A1* | 4/2024 | Liu | G02B 7/102 |
| 2024/0179388 A1* | 5/2024 | Chen | H04N 23/57 |

FOREIGN PATENT DOCUMENTS

| | | |
|---|---|---|
| CN | 111355872 A | 6/2020 |
| CN | 111367036 A | 7/2020 |
| CN | 111565264 A | 8/2020 |
| CN | 111654612 A | 9/2020 |
| CN | 211429403 U | 9/2020 |
| CN | 111988515 A | 11/2020 |
| CN | 112702494 A | 4/2021 |

OTHER PUBLICATIONS

First Office Action issued in corresponding CN Patent Application No. 202011585976.1, dated Jan. 11, 2022, 5 pages.

* cited by examiner

ELECTRONIC DEVICE AND CAMERA MODULE THEREOF HAVING A DRIVER THAT DRIVES A SLIDER TO MOVE, A LENS COMPONENT ROTATING WITH MOVEMENT OF THE SLIDER

The present application is a continuation of International Application No. PCT/CN2021/141067, filed on Dec. 24, 2021, which claims priority to Chinese Patent Application No. 202011585976.1, filed on Dec. 28, 2020. The entire contents of each of the above-referenced applications are expressly incorporated herein by reference.

TECHNICAL FIELD

The present application belongs to the technical field of communication devices, and specifically relates to an electronic device and a camera module thereof.

BACKGROUND

With the advancement of science and technology, electronic devices such as mobile phones play an important role in people's work and life, and electronic devices are usually equipped with cameras to facilitate users to shoot images. When a user shoots in a hand-held manner, a captured image or video is prone to be blurred due to shaking of the user. In the related art, a camera module is usually equipped with an optical anti-shake component to improve the clarity of a captured image and video. However, the structure of the current optical anti-shake component is relatively complicated, and the assembly and design are difficult, resulting in high costs of electronic devices.

SUMMARY

The present application discloses an electronic device and a camera module, so that the camera module has an anti-shake effect, the structure is relatively simple, and costs are low.

The embodiments of the present application are implemented as follows:

In a first aspect, the embodiment of the present application discloses a camera module, which includes a lens component, a module bracket, a driving component, and at least three connection components, where the at least three connection components are arranged around the periphery of the lens component, each of the connection components includes a slider, a first fitting portion, and a second fitting portion, the slider includes a first sliding portion and a second sliding portion connected to each other, the first sliding portion and the first fitting portion are slidably fitted with each other, the second sliding portion and the second fitting portion are slidably fitted with each other, the first fitting portion is arranged on the module bracket, the second fitting portion is arranged on the lens component, and a preset angle is formed between extending directions of the first fitting portion and the second fitting portion, and the extending directions of the first fitting portion and the second fitting portion are both inclined relative to a direction of an optical axis of the lens component, the driving component is arranged on the module bracket, and the driving component is connected to the slider, the driver is used to drive the corresponding slider to move, and an optical axis of the lens component rotates relative to the module bracket along with movement of the slider.

In a second aspect, the embodiment of the present application discloses an electronic device, including the above-mentioned camera module.

An embodiment of the present application provides a camera module. The camera module includes a lens component, a module bracket, a driving component, and at least three connection components. Each connection component includes a slider, a first fitting portion, and a second fitting portion. Both the first fitting portion and the second fitting portion are slidably connected to the slider, the first fitting portion is arranged on the module bracket, and the second fitting portion is arranged on the lens component, so that the lens component can connect to the module bracket through the at least three connection components. The driving component is connected to the slider so as to drive the slider to move. There is an acute angle between extension directions of the first fitting portion and the second fitting portion, and both the extension directions are inclined relative to a direction of an optical axis of the lens component. By making the driving component drive the slider to move, the optical axis of the lens component can rotate relative to the module bracket. In the process of shooting with the above-mentioned camera module, if the camera module shakes due to user shaking, the slider can be driven to move through the driving component, so that the camera produces shaking opposite to the shaking, so as to compensate for relative rotation between the optical axis of the camera module and a viewfinder area caused by the user shaking, so that a relative position or relative angle between the viewfinder area of the camera module and the optical axis of the lens component remains unchanged, which makes the camera module have an anti-shake function. Moreover, the structure for providing the anti-shake function in the above-mentioned camera component is relatively simple, and the difficulty of assembly and design is relatively low, thereby reducing the costs of electronic devices.

BRIEF DESCRIPTION OF DRAWINGS

The accompanying drawings described herein are intended to provide a further understanding of the present application, and constitute a portion of the present application. Example embodiments of the present application and descriptions thereof are intended to describe the present application, and do not constitute limitations on the present application. In the accompanying drawings.

DETAILED DESCRIPTION

To make the objectives, technical solutions, and advantages of the present application clearer, the following clearly describes the technical solutions of the present application with reference to the specific embodiments of the present application and the corresponding accompanying drawings. Apparently, the described embodiments are merely some rather than all of embodiments of the present application. All other embodiments obtained by a person of ordinary skill in the art based on embodiments of the present application without creative efforts shall fall within the protection scope of the present application.

The technical solutions disclosed in embodiments of the present application are described in detail below with reference to the accompanying drawings.

As shown in FIG. 1 to FIG. 4, the present application discloses a camera module, which includes a lens component 100, a module bracket 200, a driving component 320, and at least three connection components.

The lens component 100 may include at least one lens, and the light outside the camera module is incident into the camera module through the lens component 100. The module bracket 200 is the installation basis of the lens module, and the module bracket 200 can provide a protection function for the lens component 100. The module bracket 200 can be made of materials such as metal or plastic, and there are various shapes and specific structures. For example, the module bracket 200 can be a cylindrical structure, and the module bracket 200 is arranged around the outside of the lens component 100, and ensures that the bottom 210 and at least a part of a side 220 of the lens component 100 can be surrounded by the module bracket 200, so as to improve the service life of the camera module.

At least three connection components are arranged around the periphery of the lens component 100, and the lens component 100 and the module bracket 200 are connected to each other through the connection components. Each connection component includes a slider 310, a first fitting portion 221, and a second fitting portion 330, and the slider 310 further includes a first sliding portion 311 and a second sliding portion 312, and the first sliding portion 311 and the second sliding portion 312 are connected to each other, the first sliding portion 311 and the first fitting portion 221 are slidably fitted with each other, the second sliding portion 312 and the second fitting portion 330 are slidably fitted with each other, the first fitting portion 221 is arranged on the module bracket 200, and the second fitting portion 330 is disposed on the lens component 100, so that the lens component 100 and the module bracket 200 can be connected to each other through the connection component. Besides, as mentioned above, the number of connection components is at least three, at least three connection components are arranged around the periphery of the lens component 100, and the slider 310, the first fitting portion 221, and the second fitting portion 330 in each connection component are all in the above-mentioned fitting relationship, which can ensure that a reliable connection can be formed between the lens component 100 and the module bracket 200.

In some embodiments, the shapes of the first sliding portion 311 and the second sliding portion 312 may be the same or different, and may form a fixed connection relationship or a movable connection relationship, which is not limited herein. The structural forms of the first fitting portion 221 and the second fitting portion 330 can be the same or different, and can be structures such as chutes, slide bars, or slide rails, as long as the first fitting portion 221 and the second fitting portion 330 can provide a sliding guide function for the slider 310 so as to form a sliding fitting relationship with the slider. In some embodiments, at least three connection components have a same structure, so as to reduce the difficulty of spare parts and assembling, and also improve the fitting stability between the connection components.

In the connection component, a preset angle $\alpha$ is formed between the extension directions of the first fitting portion 221 and the second fitting portion 330, and $0°<\alpha<90°$, that is, the first fitting portion 221 and the second fitting portion 330 are neither parallel nor perpendicular, and a specific size of the preset included angle can be determined according to actual requirements such as a preset adjustment range of the lens component 100. This is not limited herein. Moreover, the extension directions of the first fitting portion 221 and the second fitting portion 330 are both inclined to the direction of the optical axis of the lens component 100, that is, the extension directions of the first fitting portion 221 and the second fitting portion 330 are not parallel with the direction of the optical axis, so that the extension directions of the first fitting portion 221 and the second fitting portion 330 both have a first component perpendicular to the direction of the optical axis. Besides, since a preset included angle is provided between the extension directions of the first fitting portion 221 and the second fitting portion 330, the extension direction of at least one of the first fitting portion 221 and the second fitting portion 330 also has a second component parallel to the direction of the optical axis.

The driving component 320 is arranged on the module bracket 200, and the driving component 320 may be a linear motor, an air cylinder or a hydraulic cylinder or the like. The driving component 320 is connected to the slider 310. In some embodiments, the driving head of the driving component 320 may be connected to the slider 310, and the driving component 320 can drive the slider 310 to move accordingly. That is, the driving component 320 can drive the slider 310 connected to the driving component 320 to move. Based on that the extension directions of the first fitting portion 221 and the second fitting portion 330 satisfy the above condition, the slider 310 can always be slidably fitted with the first fitting portion 221 and the second fitting portion 330 during the movement process. Furthermore, since the slider 310 can always slide on the first fitting portion 221 and the second fitting portion 330 at the same time, and one of the first fitting portion 221 and the second fitting portion 330 may not have a component parallel to the direction of the optical axis, a part of the first fitting portion 221 and a part of the second fitting portion 330 that can fit with the slider 310 at the same time have an equal first component perpendicular to the direction of the optical axis. In this way, when the slider moves, movement amounts relative to the lens component 100 and the module bracket 200 perpendicular to the direction of the optical axis are equal.

Moreover, based on the fact that there is a preset included angle between the extension directions of the first fitting portion 221 and the second fitting portion 330, components that are of the part of the first fitting portion 221 and the part of the second fitting portion 330 that can fit with the slider 310 at the same time and that are parallel to the direction of the optical axis are unequal. Therefore, it can be ensured that with the movement of the slider 310, the lens component 100 (the part or position connected to the slider 310) can move relative to the module bracket 200 along the direction of the optical axis, which can make the optical axis of the lens component 100 rotate relative to the module bracket 200, so that the orientation of the lens component 100 changes.

Figure 3:
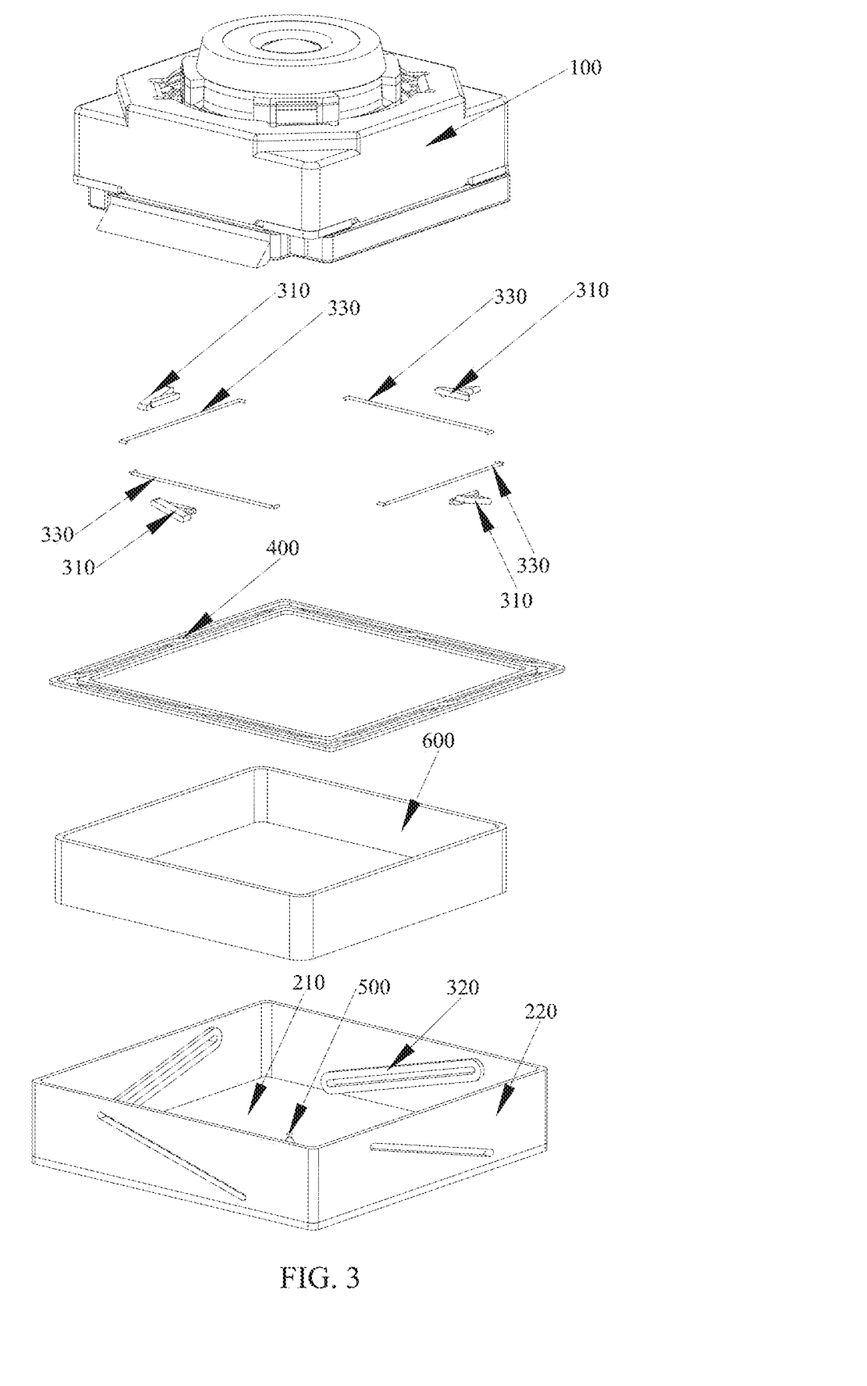
FIG. 3 is an exploded schematic view of a camera module according to an embodiment of the present application.
Figure 4:
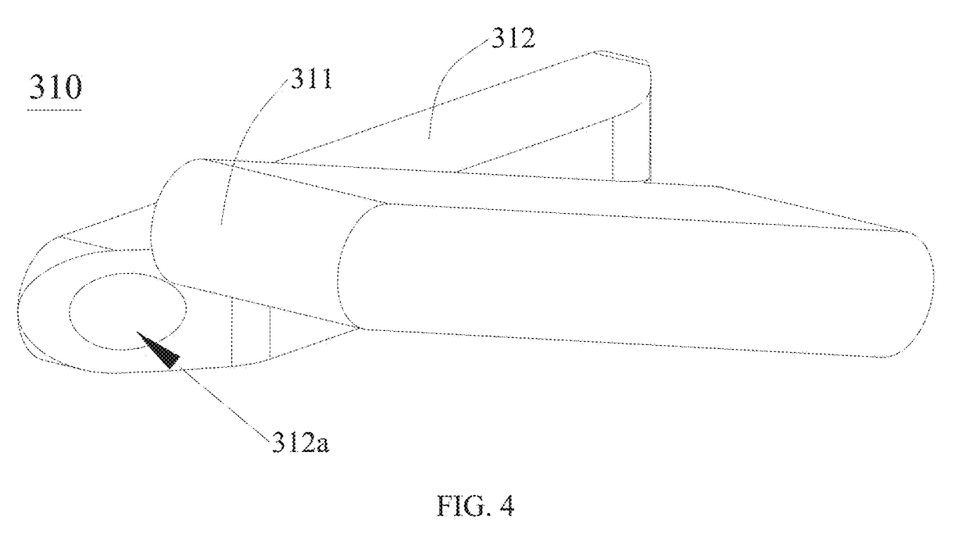
FIG. 4 is a schematic diagram of a sliding component in a camera module according to an embodiment of the present application.

In some embodiments, both the extension directions of the first fitting portion 221 and the second fitting portion 330 have a second non-zero component parallel to the direction of the optical axis. In another embodiment of the present application, for example, as shown in FIG. 3, the extending direction of the second fitting portion 330 may be perpendicular to the direction of the optical axis, that is, the extension direction of the second fitting portion 330 does not have the second component parallel to the direction of the optical axis. In other words, a value of the second component of the extension direction of the second fitting portion 330 parallel to the direction of the optical axis is zero. This can ensure that the optical axis of the lens component 100 can rotate relative to the module bracket 200, and can reduce the difficulty of assembling the second fitting portion 330.

An embodiment of the present application provides a camera module. The camera module includes a lens component 100, a module bracket 200, a driving component 320, and at least three connection components. Each connection component includes a slider 310, a first fitting portion 221, and a second fitting portion 330, the first fitting portion 221 and the second fitting portion 330 are both slidably connected to the slider 310, the first fitting portion 221 is arranged on the module bracket 200, and the second fitting portion 330 is arranged on the lens component 100, so that the lens component 100 can be connected to the module bracket 200 through the at least three connection components. The driving component 320 is connected to the slider 310 to drive the slider 310 to move. There is an acute angle between the extension directions of the first fitting portion 221 and the second fitting portion 330, and both the extension directions of the first fitting portion 221 and the second fitting portion 330 are inclined relative to the direction of the optical axis of the lens component 100. By making the driving component 320 drive the slider 310 to move, the optical axis of the lens component 100 can rotate relative to the module bracket 200. In the process of shooting with the above-mentioned camera module, if the camera module shakes due to user shaking, the slider 310 can be driven to move through the driving component 320, so that the camera produces shaking opposite to the shaking, so as to compensate for relative rotation between the optical axis of the camera module 100 and a viewfinder area caused by the user shaking, so that a relative position (or relative angle) between the viewfinder area of the camera module and the optical axis of the lens component 100 remains unchanged, which makes the camera module have an anti-shake function. Moreover, the structure for providing the anti-shake function in the above-mentioned camera component is relatively simple, and the difficulty of assembly and design is relatively low, thereby reducing the costs of electronic devices.

In the above-mentioned camera module, the number of connection components is at least three. In some embodiments, the number of driving components 320 can be two. By arranging the two driving components 320 in correspondence with the two sliders 310 respectively, the optical axis of the lens component 100 can basically be driven to rotate in multiple directions relative to the module bracket 200. In another embodiment of the present application, the number of driving components 320 may be the same as the number of connection components, and there is a one-to-one correspondence, which can improve the reliability of fitting between the lens component 100 and the module bracket 200, and can improve the adjustment precision. Besides, the rotation angle range of the optical axis of the lens component 100 relative to the module bracket 200 can be expanded to improve the adjustment ability.

In addition, in the camera module disclosed in the above embodiments, an angle detection device such as a gyroscope that can detect the rotation of the camera module relative to the viewfinder area can be provided, so that during the shooting process, the angle detection device can be used to measure rotation of the optical axis of the lens component 100 relative to the viewfinder area (a living creature or object) is measured. Then, according to the rotation, the corresponding driving component 320 can be made to work, and then the optical axis of the lens component 100 can move along a preset direction by a preset angle, to compensate for the rotation of the camera module, so as to ensure that the relative position between the optical axis of the lens component 100 and the viewfinder area remains basically unchanged.

Since the camera module can usually be used in an electronic device, and devices such as gyroscopes and gravity sensors are standard configurations of electronic devices, with the help of devices such as gyroscopes and gravity sensors in electronic devices, the angle by which the camera module rotates relative to the viewing area is measured. When the technical solution is adopted, on the one hand, the cost of the camera module can be reduced, on the other hand, the overall size of the camera module can also be reduced, and the utilization rate of devices such as gyroscopes and gravity sensors in electronic devices can be improved, to reduce the overall costs to some extent.

For example, the camera module provided in the embodiment of the present application further includes a positioning component, the positioning component is arranged on the lens component 100, the positioning component fits with the second sliding portion 312, and the positioning component can be a detachable limiting structure. When the positioning component and the second sliding portion 312 are mutually limited, the second sliding portion 312 cannot move relative to the second fitting portion 330. Correspondingly, when the positioning component is removed, the second sliding portion 312 can restore the capability of moving relative to the second fitting portion 330.

The positioning component has a first state and a second state. When the positioning component is in the first state, the second sliding portion 312 is slidably fitted with the second fitting portion 330, that is, the second fitting portion 330 and the slider 310 are in a released state. In the above state, the driving component 320 drives the slider 310 to move, allowing the optical axis of the lens component 100 to rotate relative to the module bracket 200 with the movement of the slider 310. In this embodiment, it can be considered that there is no interaction between the positioning component and the second sliding portion 312, and the movement of the slider 310 and the lens component 100 is the same as that of the above embodiment, and will not be repeated herein.

When the positioning component is in the second state, the second sliding portion 312 is relatively fixed to the second fitting portion 330, that is, the second sliding portion 312 can be locked on the second fitting portion 330 by means of the positioning component. In this case, the slider 310 and the lens component 100 are relatively fixed, and the slider 310 can drive the lens component 100 to move along the first fitting portion 221. As mentioned above, the first fitting portion 221 has a component perpendicular to the direction of the optical axis of the lens component 100. Therefore, when the driving component 320 drives the slider 310 to move along the first fitting portion 221, the lens component 100 can rotate relative to the module bracket 200 along the direction of the optical axis of the lens component 100.

In the case of adopting the above technical solution, by changing the state of the positioning component, the lens component 100 can rotate around its own optical axis. In this case, the orientation of the lens component 100 remains unchanged, and the relative angle between the lens component 100 and the viewing area can be changed. In addition, the optical axis of the lens component 100 can rotate relative to the module bracket 200, so that the orientation of the lens component 100 can be changed, thereby improving the ability of the camera module to adjust its own orientation, making the camera module more effective in anti-shake, and improving the user experience.

In another embodiment of the present application, both the driving component 320 and the positioning component may include electromagnets, and correspondingly, the slider 310 may include magnetic parts. That is, the driving component 320 can drive the slider 310 to move through the magnetic force, and the positioning component can position the slider 310 on the second fitting portion 330 through the magnetic force. In the case of adopting the above-mentioned embodiment, the driving component 320 and the positioning component can be operated by turning on and off the power, and the driving force of the driving component 320 can be changed by changing the magnitude of the current passing through the driving component 320, so that the slider 310 moves to the corresponding position. Correspondingly, whether the positioning component fixes the slider 310 on the second fitting portion 330 can be controlled by turning on and off the power. The control process is relatively simple and convenient, and there is no need to design a more complicated mechanical connection. The structure can reduce the difficulty of designing, assembling and controlling the driving component 320 and the positioning component.

In some embodiments, the driving component 320 may include two electromagnets, and the two electromagnets are respectively arranged at the opposite ends of the first fitting portion 221. When it is necessary to drive the slider 310 to move, the two electromagnets may both apply repulsive force to the slider 310. Besides, by controlling the magnitude of the magnetic force of the two electromagnets, the slider 310 can be positioned at different positions of the first fitting portion 221, thereby driving the optical axis of the lens component 100 to rotate in different directions by a corresponding angle.

In another embodiment of the present application, the driving component 320 may include a plurality of electromagnets separated from each other, and the plurality of electromagnets are arranged along the extension direction of the first fitting portion 221. In a process of controlling the slider 310 to move, the electromagnet located at the end of the first fitting portion 221 can be controlled to apply a repulsive force to the slider 310, so that the slider 310 moves along the first fitting portion 221. Besides, by correspondingly controlling the operation of the electromagnet close to the slider 310, the slider 310 can move to any position of the first fitting portion 221. Then, by controlling the electromagnets on opposite sides of the slider 310 to attract the opposite ends of the slider 310, the slider 310 can also be positioned and held at the adjusted position. Therefore, the rotation direction and rotation angle of the optical axis of the lens component 100 relative to the module bracket 200 can be adjusted by controlling the position of the slider 310.

In some embodiments, the positioning component may include two electromagnets located at opposite ends of the second fitting portion 330 respectively. When the two electromagnets are both energized, they can both apply a repulsive force to the slider 310, so that the slider 310 is positioned at a certain position on the second fitting portion 330, and the slider 310 and the second fitting portion 330 remain fixed. When the positioning component is in a power-off state, the slider 310 can slide along the second fitting portion 330 driven by the driving component 320.

In some alternative embodiments, the positioning component can be arranged at a certain position of the second fitting portion 330, and the positioning component can apply an adsorption force to the slider 310 when the positioning component is in the energized state, so that the slider 310 is fixed at the second fitting portion 330 due to mutual attraction with the positioning component, and the slider 310 can only move relative to the first fitting portion 221. Of course, the driving component 320 and the positioning component can also be other electromagnets capable of achieving the above functions, which will not be listed herein. In addition, the magnetic parts included in the slider 310 can also be electromagnets. In another embodiment of the present application, the slider 310 can be a permanent magnet, so as to reduce the difficulty of designing and assembling the camera module, and can reduce the cost of the camera module.

As mentioned above, the module bracket 200 can be a cylindrical structural member. In order to improve the reliability of the connection between the connection component and the module bracket 200, for example, as shown in FIG. 3, the module bracket 200 includes a bottom 210 and a side 220. The side 220 and the bottom 210 are connected to each other and enclose to form an accommodating cavity, and at least a part of the lens component 100 is accommodated in the accommodating cavity, so that the module bracket 200 can provide more comprehensive protection for the lens component 100. The side 220 includes four side walls with two side walls opposite to each other, and any two adjacent side walls are perpendicular to each other, and each side wall is provided with a first fitting portion 221 to improve the fitting stability of the first fitting portion 221 and the module bracket 200. Moreover, in the above-mentioned embodiment, the number of connection components arranged around the lens component 100 can be four, which can further improve the connection stability between the lens component 100 and the module bracket 200.

In addition, two of the four connection components are arranged opposite to each other, and the two opposite connection components form a group, and connection lines between two opposite connection components in the two groups are perpendicular to each other. During the anti-shake process of the camera module, the rotation of the optical axis of the lens component 100 relative to the module bracket 200 can be decomposed into two components that rotate in mutually perpendicular planes. By adopting the above technical solution, the rotation of the optical axis of the lens component 100 on two mutually perpendicular planes can be realized by the two groups of driving components 320, which can reduce the difficulty of adjusting the lens component 100, and improve the adjustment precision of the lens component 100 to some extent.

As mentioned above, the lens component 100 and the module bracket 200 can be connected to each other through the connection component. In order to further improve the connection reliability between the lens component 100 and the module bracket 200, the camera module provided in the embodiment of the present application can also include a connecting shaft 500 and a bushing, and the bushing and the connecting shaft 500 are rotatably connected along the direction of the optical axis of the lens component 100, so as to ensure that the lens component 100 and the module bracket 200 can rotate relatively around the optical axis of the lens component 100. Besides, the bushing and the connecting shaft 500 are movably fitted in the direction of the optical axis of the lens component 100, so as to ensure that the optical axis of the lens component 100 can rotate relative to the module bracket 200. One of the connecting shaft 500 and the bushing is connected to the lens component 100, and the other is connected to the module bracket 200. Therefore, in addition to the connection component, the lens component 100 and the module bracket 200 can also be connected through the connecting shaft 500 and the bushing, to further improve the connection reliability of the lens component 100 and the module bracket 200.

In some embodiments, both the bushing and the connecting shaft 500 can be cylindrical structural members, and the interior of the bushing can be provided with a cylindrical cavity. By making the inner size of the bushing larger than the size of the connecting shaft 500, the connecting shaft 500 can rotate relative to the bushing along the direction of the optical axis. This can also ensure that the connecting shaft 500 can be inclined relative to the bushing, thereby ensuring that the optical axis of the lens component 100 can rotate relative to the module bracket 200.

In another embodiment of the present application, the connecting shaft 500 includes a first limiting portion and a second limiting portion, the first limiting portion has a first end surface and a second end surface arranged opposite to each other, and the second limiting portion includes a third end surface and a fourth end surface arranged opposite to each other. The first end surface is fixed to the module bracket 200, that is, the first limiting portion is fixedly connected to the module bracket 200. The second end surface is connected to the third end surface, that is, the second limiting portion is fixed on the first limiting part. The first end surface, the second end surface, the third end surface, and the fourth end surface are coaxially arranged and all have a circular structure. This ensures that the side surface connected between the first end surface and the second end surface in the first limiting portion, and the side surface connected between the third end surface and the fourth end surface in the second limiting portion can both be ring-shaped structural members, so that the rotation fitting between the connection shaft 500 and the bushing is relatively tight. In some embodiments, the first limiting portion and the second limiting portion can be conical structural members, or the side surfaces of the first limiting portion and the second limiting portion can both protrude outward or be concave inward.

At the same time, the areas of the first end face and the fourth end face are larger than the area of the second end face, the areas of the first end face and the fourth end face are larger than the area of the third end face, and a part of the bushing can extend into a position between the first end surface and the fourth end surface, so as to be connected to the connecting shaft 500. That is, relative to the first end surface and the fourth end surface, the second end surface and the third end surface are retracted, so that an avoidance space for fitting with the bushing can be formed between the first end surface and the second end surface. A part of the bushing can protrude into the avoidance space, so that the bushing is connected to the connecting shaft 500. In this embodiment, it can be considered that both the connecting shaft 500 and the bushing are approximately hourglass-shaped structures.

In the case that the connecting shaft 500 and the bushing adopt the above structure, the structure between the first end surface and the fourth end surface of the connecting shaft 500 can provide a limiting function for the bushing, so that the fitting relationship between the bushing and the connecting shaft 500 is more stable. Moreover, by designing the dimensions of the connecting shaft 500 and the bushing, it can be ensured that the connecting shaft 500 and the bushing can rotate relatively around the optical axis of the lens component 100, and it can also be ensured that the bushing can produce a certain inclination relative to the connecting shaft 500, so that the optical axis of the lens component 100 can rotate relative to the module bracket 200.

As mentioned above, the structures of the first fitting portion 221 and the second fitting portion 330 can be various. Since the first fitting portion 221 is arranged on the module bracket 200, and the main functions of the module bracket 200 are installation and protection. In some embodiments, the first fitting portion 221 is a chute. The setting of the chute basically does not affect the structural strength of the module bracket 200, and basically does not damage the function of the module bracket 200. Moreover, by making the first sliding portion 311 of the slider 310 extend into the chute, the gap between the module bracket 200 and the lens component 100 can be relatively smaller, which can reduce the overall size of the camera module.

In some embodiments, the chute may be a blind chute, that is, the chute is not disposed through the module bracket 200, and in another embodiment of the present application, the chute may be disposed through the module bracket 200. As mentioned above, the module bracket 200 may include the side 220, and the side 220 includes side walls, and each side wall may be provided with a chute. In this case, the chute is provided through the side wall. On one hand, the processing difficulty of the chute can be reduced, and on the other hand, this can also prevent the slider 310 from being stuck at the bottom 210 of the chute, and improve the stability of fitting between the slider 310 and the chute.

Since the second fitting portion 330 is installed on the lens component 100, in order to prevent the lens component 100 from being damaged due to arrangement of the second fitting portion 330. In some embodiments, the second fitting portion 330 is a slide bar, and the opposite ends of the slide bar can be fixed on the lens component 100 by means of bonding or the like, so that the second fitting portion 330 can provide a guiding function for the slider 310 and at the same time this can prevent the second fitting portion 330 from damaging the lens component 100. In some embodiments, in order to further prevent the setting of the second fitting portion 330 from possibly damaging the lens component 100, for example, as shown in FIG. 3, a lens bracket 600 may be provided outside the lens component 100, and the two are fixedly connected. The second fitting portion 330 may be installed outside the lens bracket 600.

In the case that the second fitting portion 330 is a sliding bar, the second sliding portion 312 of the slider 310 can be sleeved on the sliding bar. In some embodiments, the second sliding portion 312 can be provided with a through hole 312*a*, and the second sliding portion 312 can be sleeved outside the sliding bar through the through hole 312*a*, so as to further improve the reliability of the sliding fit relationship between the sliding bar and the slider 310.

As mentioned above, the first sliding portion 311 and the second sliding portion 312 of the slider 310 are connected to each other. When the driving component 320 drives the slider 310 to move, the optical axis of the lens component 100 can rotate relative to the module bracket 200. Obviously, in the aforementioned process, there must be a rotation axis when the lens component 100 and the module bracket 200 rotate relative to each other. For example, the number of connection components is four. The four connection components distributed sequentially along the direction of the optical axis of the lens component 100 are respectively a first connection component, a second connection component, a third connection component, and a fourth connection component, where the first connection component and the third connection component are arranged opposite to each other, and the second connection component and the fourth connection component are arranged opposite to each other. When the driving component 320 connected to the first connection component drives the slider 310 in the first connection component to move, the position of the lens component 100 connected to the first connection component can move along the direction of the optical axis of the lens component 100 relative to the module bracket 200. In this process, the rotation axis of the lens component 100 is a connecting line between the second connection component and the fourth connection component.

Since the second connection component (and the fourth connection component) are both connected to the lens component and the module bracket, during the relative rotation of the lens component 100 and the module bracket 200, the lens component 100 also moves relative to the first sliding portion 311 (the first fitting portion 221 slidably connected to the module bracket 200) rotates, and correspondingly, the module bracket 200 also rotates relative to the second sliding portion 312 (the second fitting portion 330 slidably connected to the lens component 100).

Based on the above situation, for example, at least one of the first fitting portion 221 and the second fitting portion 330 is a chute, and a structure corresponding to the chute is a cylindrical structural member. In some embodiments, for example, the first fitting portion 221 is a chute. The first sliding portion 311 can be a cylindrical structural member, and the first sliding portion 311 extends into the first fitting portion 221, so that the first sliding portion 311 can rotate in the first fitting portion 221, and the second sliding portion 312 can rotate relative to the first fitting portion 221, so as to ensure that the lens component 100 can rotate relative to the module bracket 200 with the slider 310 as the axis, so that the optical axis of the lens component 100 changes relative to the module bracket 200, thereby changing the orientation of the lens component 100. In the case that both the first fitting portion 221 and the second fitting portion 330 are chutes, and the first sliding portion 311 and the second sliding portion 312 are both cylindrical structural members, it is more possible to ensure that the lens component 100 can rotate relative to module bracket 200 with the slider 310 as the axis.

In another embodiment of the present application, in order to improve the fitting stability between the first sliding portion 311 and the first fitting portion 221, for example, the first sliding portion 311 is a bar-shaped structure, and the first sliding portion 311 extends along the extension direction of the first fitting portion 221. This basically prevents relative rotation between the first sliding portion 311 and the first fitting portion 221, ensuring a strong connection between the first sliding portion 311 and the first fitting portion 221. Correspondingly, the second sliding portion 312 can also be a bar-shaped structure, and the second sliding portion 312 extends along the extension direction of the second fitting portion 330, thereby ensuring that there is high matching stability and connection tightness between the second sliding portion 312 and the second fitting portion 330, to achieve the purpose of improving the connection reliability between the lens component 100 and the module bracket 200.

Moreover, the first sliding portion 311 and the second sliding portion 312 are rotationally connected, thereby ensuring that the slider 310 of the above structure can provide a function similar to a rotating shaft for the rotation of the lens component 100, and ensuring that the optical axis of the lens component 100 can rotate relative to the module bracket 200, thereby changing the orientation of the lens component 100. In some embodiments a structural member such as a rotating base can be provided between the first sliding portion 311 and the second sliding portion 312 to ensure that a rotational connection relationship can be formed between the first sliding portion 311 and the second sliding portion 312. In addition, as mentioned above, the first fitting portion 221 can be a chute. In order to reduce the difficulty of moving the first sliding portion 311 in the first fitting portion 221, the opposite ends of the first sliding portion 311 can be provided with arc guide surfaces.

As mentioned above, the lens component 100 and the module bracket 200 are connected through a connection component. In some embodiments, a connecting shaft 500 and a bushing may also be provided between the lens component 100 and the module bracket 200, so as to improve connection reliability between the lens component 100 and the module bracket 200.

Figure 1:
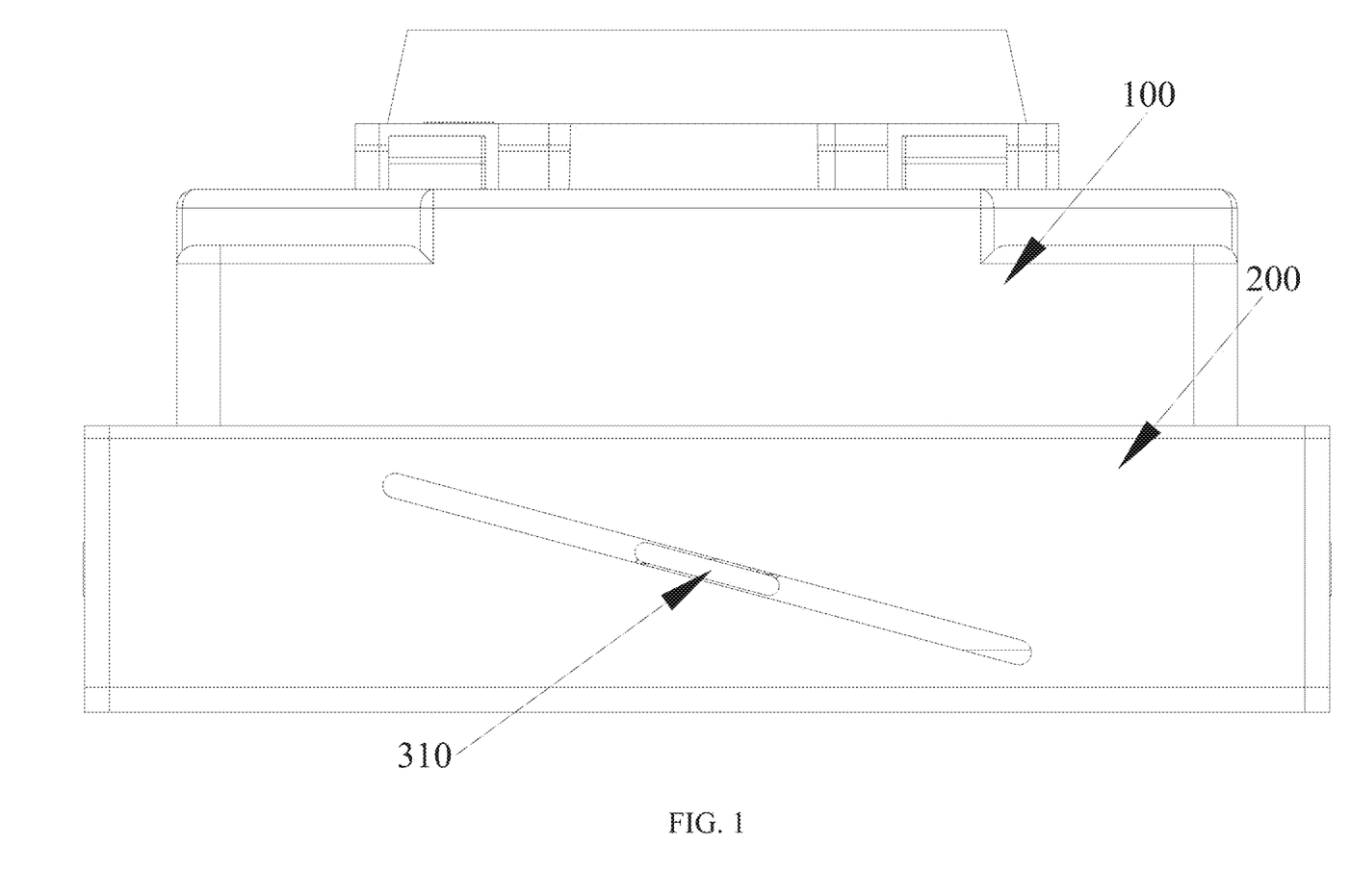
FIG. 1 is a schematic structural diagram of a camera module according to an embodiment of the present application.
Figure 2:
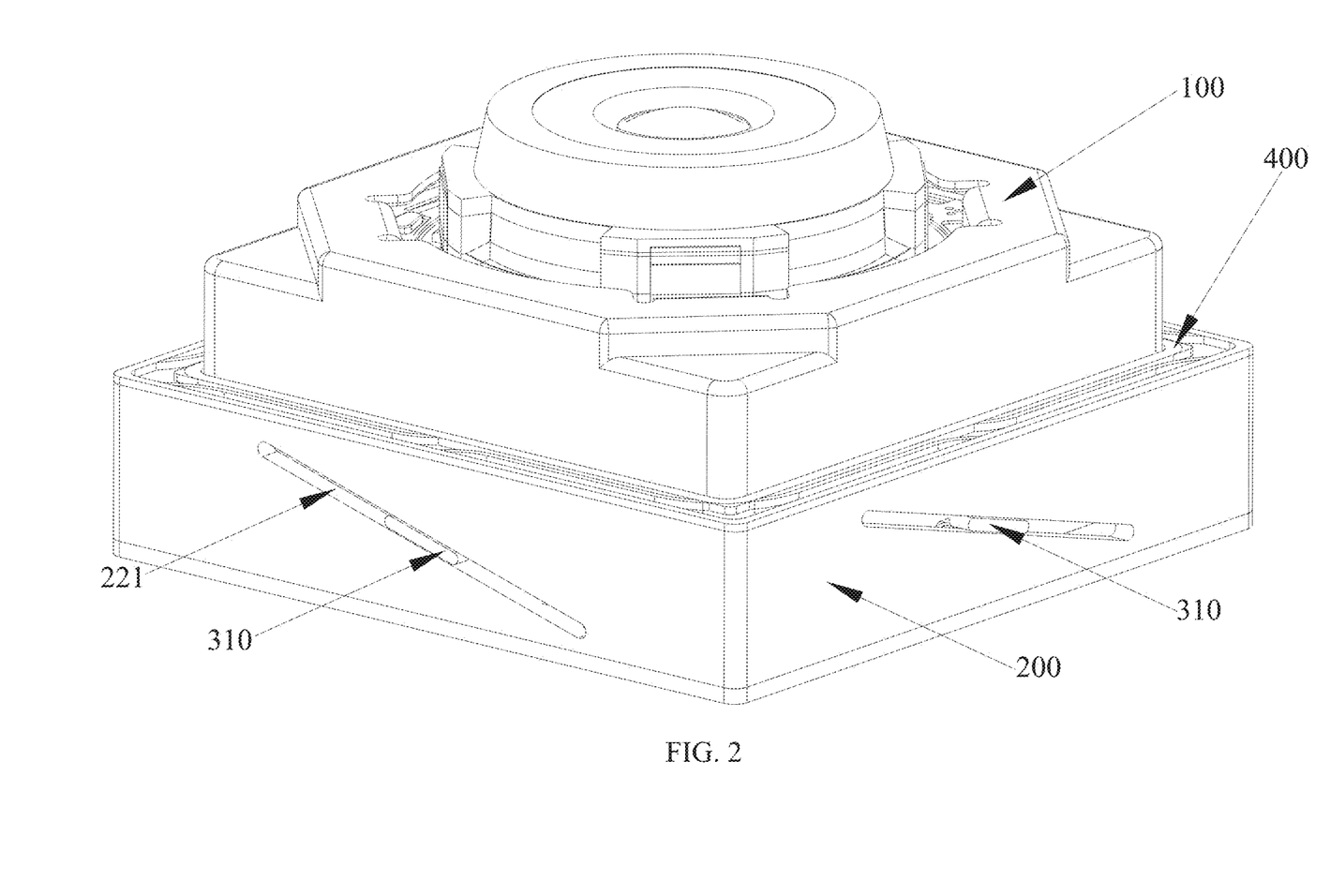
FIG. 2 is a schematic diagram of a camera module in another direction according to an embodiment of the present application.

In another embodiment of the present application, for example, as shown in FIG. 2 and FIG. 3, the camera module may further include an elastic connector 400 through which the lens component 100 and the module bracket 200 are connected to each other. Under the action of the elastic connector 400, the reliability of the connection between the lens component 100 and the module bracket 200 can be improved. Besides, after the driving component 320 drives the lens component 100 to move relative to the module bracket 200, the elastic connector 400 can also enable the lens component 100 to have a tendency to restore its initial state. After the driving force is removed by the driving component 320, the elastic connector 400 can restore the lens component 100 to its initial position. Therefore, the lens component 100 does not need to reset with the help of the driving component 320, reducing the control difficulty of the lens component 100.

In some embodiments, the elastic connector 400 may be connected to a side of the lens component 100 away from a light-incident side, that is, the elastic connector 400 is disposed between the bottom 210 of the lens component 100 and the bottom 210 of the module bracket 200. In some embodiments, as shown in FIG. 2 and FIG. 3, the elastic connector 400 may be disposed around the outside of the side wall of the lens component 100 and connected to the inner wall of the side 220 of the module bracket 200. A number of elastic connectors 400 can be multiple, and multiple elastic connectors 400 are arranged around the side wall of the lens component 100 around the optical axis of the lens component 100. One end of each elastic connector 400 is connected to the lens component 100, and the other end is connected to the module bracket 200, so that the elastic connecting member 400 acts like a "suspension spring". In addition, in order to minimize the hindrance effect exerted by the elastic connector 400 on the lens component 100 when the lens component 100 rotates around its own optical axis relative to the module bracket 200, the extension direction of the elastic connector 400 can have a component along the direction of the optical axis. In other words, opposite ends of the elastic connector 400 are separated from each other along the direction of the optical axis of the lens component 100.

Based on the camera module disclosed in any of the above embodiments, the embodiment of the present application also provides an electronic device, and the electronic device includes the camera module provided in any of the above embodiments. Of course, the electronic device also includes a display module, a housing, and other devices such as batteries, which will not be introduced one by one herein.

The electronic device disclosed in embodiments of the present application may be a smart phone, a tablet computer, an e-book reader, or a wearable device. The electronic device may also be another device. This is not limited in embodiments of the present application.

The embodiments of the present application focus on describing differences between the embodiments, and different optimization features of the embodiments may be combined to form better embodiments provided that they are not contradictory. Considering brevity, details are not described herein again.

The foregoing descriptions are merely embodiments of the present application, and are not intended to limit the present application. Various changes and modifications may be made to the present application by a person skilled in the art. Any modifications, equivalent substitutions, improvements, and the like made within the spirit and principle of the present application should be included within the scope of the claims of the present application.

The invention claimed is:

1. A camera module, comprising a lens component; a module bracket; a driving component; and at least three connection components,
wherein:
the at least three connection components are arranged around the periphery of the lens component,
each of the connection components comprises a slider, a first fitting portion, and a second fitting portion,
the slider comprises a first sliding portion and a second sliding portion connected to each other,
the first sliding portion and the first fitting portion are slidably fitted with each other,
the second sliding portion and the second fitting portion are slidably fitted with each other,
the first fitting portion is arranged on the module bracket,
the second fitting portion is arranged on the lens component,
a preset angle is formed between extending directions of the first fitting portion and the second fitting portion,
the extending directions of the first fitting portion and the second fitting portion are both different from a direction of an optical axis of the lens component,
the driving component is arranged on the module bracket, and the driving component is connected to the slider,
the driver is used to drive the corresponding slider to move, and
the lens component rotates relative to the module bracket along with movement of the slider.

2. The camera module according to claim 1, further comprising a positioning component,
wherein:
the positioning component is arranged on the lens component, and the positioning component fits with the second sliding portion,
the positioning component has a first state and a second state,
when the positioning component is in the first state, the second sliding portion slidably fits with the second fitting portion, and the driving component drives the slider to move, the optical axis of the lens component rotates relative to the module bracket along with the movement of the slider;
when the positioning component is in the second state, the second sliding portion fits and the fitting portion are relatively fixed, the driving component drives the slider to move, and
the lens component rotates around its own optical axis relative to the module bracket along with the movement of the slider.

3. The camera module according to claim 2, wherein both the driving component and the positioning component comprise electromagnets, and the slider comprises a magnetic element.

4. The camera module according to claim 2,
wherein:
the module bracket comprises a bottom and a side, and the side is connected to the bottom to form an accommodating cavity,
at least a part of the lens component is accommodated in the accommodating cavity,
the side comprises four side walls with two side walls opposite to each other,
any two adjacent side walls are perpendicular to each other, and
each of the side walls is provided with the first fitting portion.

5. The camera module according to claim 2, further comprising a connecting shaft and a bushing,
wherein:
the bushing and the connecting shaft are rotatably connected in a direction around the optical axis of the lens component,
the bushing and the connecting shaft are movably fitted in the direction of the optical axis of the lens component,
one of the connecting shaft and the bushing is connected to the lens component, and
the other is connected to the module bracket.

6. The camera module according to claim 5, wherein the connecting shaft comprises a first limiting portion and a second limiting portion, wherein the first limiting portion has a first end surface and a second end surface arranged opposite to each other, and the second limiting portion comprises a third end face and a fourth end face arranged opposite to each other,
wherein:
the first end face is fixed to the module bracket, the second end face is connected to the third end face, and the first end face, the second end face, and the third end face and the fourth end face are coaxially arranged and are all circular structures;
areas of the first end face and the fourth end face are both larger than an area of the second end face, and areas of the first end face and the fourth end face are both larger than an area of the third end face; and
a part of the fitting portion protrudes between the first end surface and the fourth end surface to be connected to the connecting shaft.

7. The camera module according to claim 1, wherein the first fitting portion is a slide groove, and the second fitting portion is a slide bar.

8. The camera module according to claim 1,
wherein:
the first sliding portion is a bar-shaped structure, and the first sliding portion extends along the extension direction of the first fitting portion;

the second sliding portion is a bar-shaped structure, and the second sliding portion extends along the extension direction of the second fitting portion; and the first sliding portion and the second sliding portion are rotatably connected to each other.

9. The camera module according to claim 1, further comprising an elastic connector, wherein the lens component and the module bracket are connected through the elastic connector.

10. An electronic device, comprising a camera module comprising: a lens component; a module bracket; a driving component; and at least three connection components, wherein:

the at least three connection components are arranged around the periphery of the lens component, each of the connection components comprises a slider, a first fitting portion, and a second fitting portion, the slider comprises a first sliding portion and a second sliding portion connected to each other, the first sliding portion and the first fitting portion are slidably fitted with each other, the second sliding portion and the second fitting portion are slidably fitted with each other, the first fitting portion is arranged on the module bracket, the second fitting portion is arranged on the lens component, a preset angle is formed between extending directions of the first fitting portion and the second fitting portion, the extending directions of the first fitting portion and the second fitting portion are both different from a direction of an optical axis of the lens component, the driving component is arranged on the module bracket, and the driving component is connected to the slider, the driver is used to drive the corresponding slider to move, and the lens component rotates relative to the module bracket along with movement of the slider.

11. The electronic device according to claim 10, wherein the camera module further comprises a positioning component, wherein:

the positioning component is arranged on the lens component, and the positioning component fits with the second sliding portion, the positioning component has a first state and a second state, when the positioning component is in the first state, the second sliding portion slidably fits with the second fitting portion, and the driving component drives the slider to move, the optical axis of the lens component rotates relative to the module bracket along with the movement of the slider;

when the positioning component is in the second state, the second sliding portion fits and the fitting portion are relatively fixed, the driving component drives the slider to move, and the lens component rotates around its own optical axis relative to the module bracket along with the movement of the slider.

12. The electronic device according to claim 11, wherein both the driving component and the positioning component comprise electromagnets, and the slider comprises a magnetic element.

13. The electronic device according to claim 11, wherein:

the module bracket comprises a bottom and a side, and the side is connected to the bottom to form an accommodating cavity, at least a part of the lens component is accommodated in the accommodating cavity, the side comprises four side walls with two side walls opposite to each other, any two adjacent side walls are perpendicular to each other, and each of the side walls is provided with the first fitting portion.

14. The electronic device according to claim 11, wherein the camera module further comprises a connecting shaft and a bushing, wherein:

the bushing and the connecting shaft are rotatably connected in a direction around the optical axis of the lens component, the bushing and the connecting shaft are movably fitted in the direction of the optical axis of the lens component, one of the connecting shaft and the bushing is connected to the lens component, and the other is connected to the module bracket.

15. The electronic device according to claim 14, wherein the connecting shaft comprises a first limiting portion and a second limiting portion, wherein the first limiting portion has a first end surface and a second end surface arranged opposite to each other, and the second limiting portion comprises a third end face and a fourth end face arranged opposite to each other, wherein:

the first end face is fixed to the module bracket, the second end face is connected to the third end face, and the first end face, the second end face, and the third end face and the fourth end face are coaxially arranged and are all circular structures;

areas of the first end face and the fourth end face are both larger than an area of the second end face, and areas of the first end face and the fourth end face are both larger than an area of the third end face; and a part of the fitting portion protrudes between the first end surface and the fourth end surface to be connected to the connecting shaft.

16. The electronic device according to claim 10, wherein the first fitting portion is a slide groove, and the second fitting portion is a slide bar.

17. The electronic device according to claim 10, wherein:

the first sliding portion is a bar-shaped structure, and the first sliding portion extends along the extension direction of the first fitting portion;

the second sliding portion is a bar-shaped structure, and the second sliding portion extends along the extension direction of the second fitting portion; and the first sliding portion and the second sliding portion are rotatably connected to each other.

18. The electronic device according to claim 10, wherein the camera module further comprises an elastic connector, wherein the lens component and the module bracket are connected through the elastic connector.

* * * * *